April 5, 1966 C. R. POSSELL 3,244,255
JET ENGINE NOISE SUPPRESSOR AND BOOSTER
Filed Jan. 14, 1965 2 Sheets-Sheet 1
FIG. 1
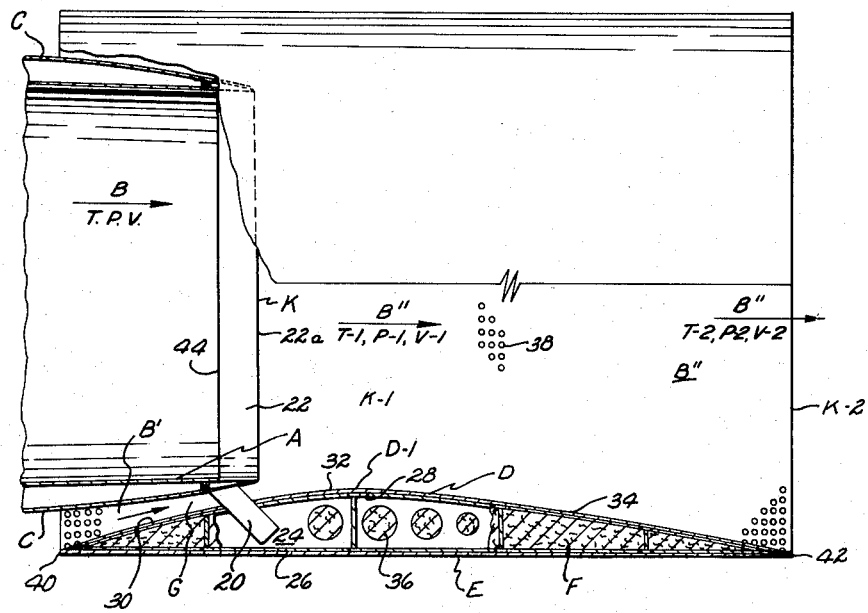
FIG. 2
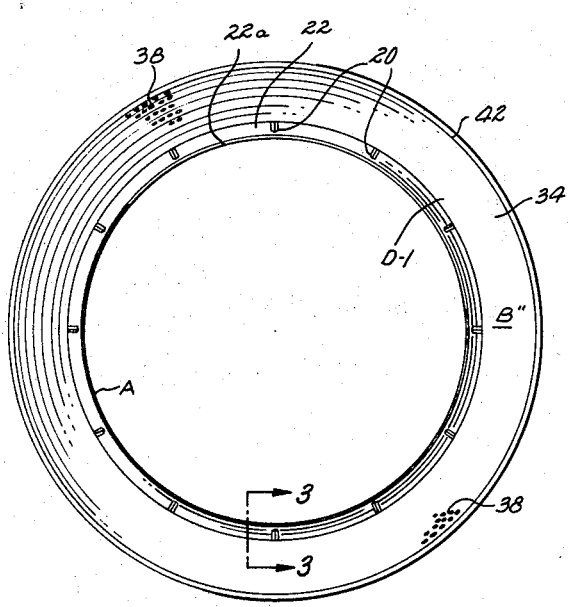
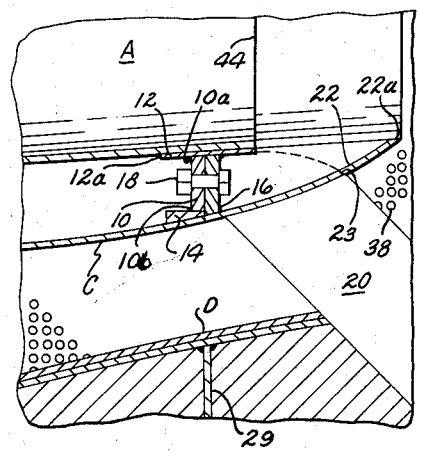
FIG. 3
INVENTOR.
CLARENCE R. POSSELL
BY
ATTORNEY

United States Patent Office 3,244,255
Patented Apr. 5, 1966

3,244,255
JET ENGINE NOISE SUPPRESSOR AND BOOSTER
Clarence R. Possell, 2039-A Compton Blvd.,
Gardena, Calif.
Filed Jan. 14, 1965, Ser. No. 426,478
10 Claims. (Cl. 181—51)

The present invention relates to the field of aeronautical accessories, and more particularly to a noise suppressor for use with jet engines. This application is a continuation-in-part of application Serial No. 161,582 entitled, Jet Engine Noise Suppressor, filed in the United States Patent Office on December 22, 1961, now abandoned.

In recent years the propulsion of aircraft by the use of jet engines has steadily increased. While such engines provide higher speeds for aircraft than is possible with the propeller type, as well as numerous other desirable features, the major disadvantage of jet engines is that they are extremely noisy, especially when on the ground just before take-off. The noise generated by jet engines, particularly on commercial aircraft, has been so great that the airlines companies have been required to minimize this noise at great expense and with substantial sacrifice of the efficiency of the jet-powered planes.

Although numerous sound suppressors have been evolved in the past and have been used in an effort to minimize the noise from jet engines, the most commonly used today is of a structure that includes a number of tubular members which extend rearwardly from the nozzle of the jet engine. These tubular members sub-divide the stream of hot gases from the engine into a number of separate streams that are usually directed away from one another as they discharge into the ambient atmosphere to minimize the creation of sound as the hot gases expand therein.

This type of noise suppressor has a number of operational disadvantages, the major one of which is that it is unduly heavy, weighing approximately 800 lbs. for each engine. Also, due to being disposed in the hot stream of discharging gases, this suppressor is subjected to varying temperatures whereby the maintenance cost to the airline companies is quite high because of corrosion as well as failure of the metal defining the suppressors after a relatively short life due to creep, crystallization, and the like.

In addition, suppressors heretofore available offer substantial resistance to the flow of the hot discharging gases therethrough, and as a result materially lower the efficiency of the jet engines. Another factor to be considered in the maintenance of present-day suppressors is that each engine must have three suppressors; one that is currently in use, a second as a spare, and a third that is usually in the process of being repaired or reconditioned after previous operation thereof in conjunction with the engine.

A major object of the present invention is to provide a noise suppressor for use on jet engines that has an extremely simple mechanical structure, weights but 170 lbs. per engine in comparison with the 800 lb. weight necessary heretofore, does not appreciably interfere with the flow of the hot discharging gases from the jet engine, and hence is not subjected to the problems of creep rupture and other metallurgical problems encountered with present-day suppressors.

Another object of the present invention is to provide a noise suppressor for use on jet engines that is substantially less expensive than suppressors currently available not only from the standpoint of the initial purchase price, but in the maintenance cost as well.

A still further object of the invention is to provide a noise suppressor that not only permits the more efficient operation of a jet engine, but one that in addition to suppressing operational noise, actually increases the efficiency of the engine rather than detracting therefrom such as is the case with present-day equipment.

These and other objects and advantages of the present invention will become apparent from the following description thereof and from the accompanying drawing illustrating the same, in which:

FIGURE 1 is a combined side elevational and vertical cross-sectional view of the noise suppressor of the present invention disposed rearwardly of the nozzle of a jet engine and co-axially aligned therewith;

FIGURE 2 is a rear elevational view of the suppressor;

FIGURE 3 is an enlarged fragmentary cross-sectional view of a portion of the device illustrating the manner in which one of the suppressors can be removably affixed to the rear portion of a jet engine nozzle.

Figure 4:
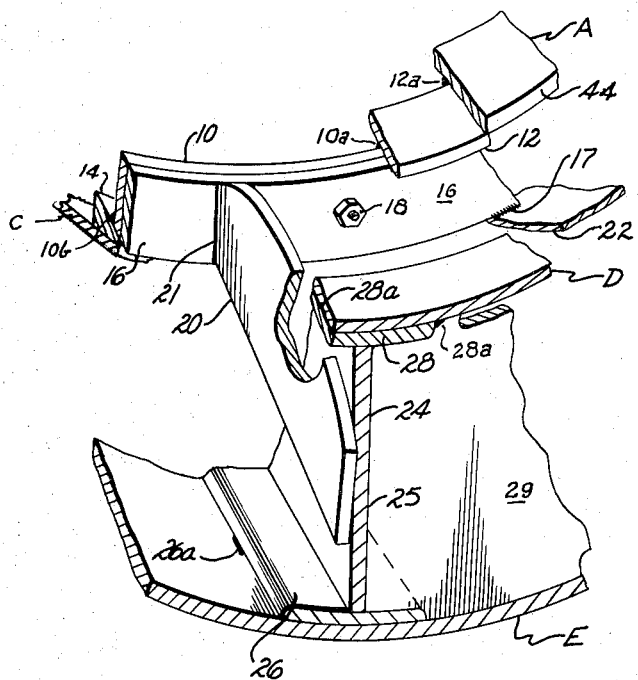
FIGURE 4 is a fragmentary perspective view of a portion of the suppressor and the bracket and ring structure used in removably supporting the suppressor from a jet engine.

With continued reference to the drawing, a jet engine nozzle A of tubular configuration is shown in FIGURE 1 through which a stream of hot gases B is discharged rearwardly during operation of the engine. As these gases discharge from the rear extremity of the nozzle A they are at a first temperature, a first pressure, and a first velocity. The velocity of this stream B of discharging gases is so high and the heat content thereof so great that if this stream were permitted to discharge directly into the ambient atmosphere there would be such a rapid expansion of the gases therein that noise waves of a high intensity would be generated, and it would be most disagreeable for one to be in the vicinity of the jet engine from which such discharge was emitted. In a case of an airliner having four jet engines operating concurrently, the noise level from the discharging jet streams is, of course, substantially higher than when one engine is operating, and may on occasion be so intense as to not only be disagreeable, but practically unbearable.

The nozzle A, as can best be seen in FIGURE 1, normally has an enveloping cylindrical sheath C of a sheet material extending therearound, and this sheath has its major transverse cross section at either the longitudinal center of the engine or forwardly therefrom, depending upon the aerodynamics of the particular aircraft it is powering. The rear portion of sheath C is secured to the rear exterior surface of nozzle A by a rigid, transversely disposed ring 10, as may best be seen in FIGURE 3. The inner edge of the ring 10 is welded by a bead 10a to a band 12 that is in abutting contact with the rear exterior surface of the nozzle A. Band 12 is in turn welded by a bead 12a to the exterior surface of nozzle A. The outer edge of ring 10 is welded by a bead 10b to a second band 14, which in turn is rigidly affixed to the interior surface of sheath C.

A second ring 16 of the same dimensions as the first ring 10 abuts against the rear surface thereof. The second ring 16 is held in this abutting position by a number of bolts 18, or other fastening means that extend through bores formed in both rings 10 and 16. The second ring 16 supports a number of rearwardly and outwardly extending brackets 20 which are in circumferentially spaced relationship, as shown in FIGURE 2. The forward end portion of each bracket 20 is either welded at point 21 to the rear face of ring 16 as shown in FIGURE 4, or is affixed thereto by other conventional means. The second ring 16 also serves to support a ring-shaped sheet of material having a slightly convex exterior surface and serves as an extension 22 of the sheath C, as may best be seen in FIGURE 3. The forward interior surface portion of extension 22 is welded to the second ring 16 by a bead 17, as shown in FIGURE 4. The purpose of extension 22 will be described in detail hereinafter. Extension 22 has a number of slots formed therein through which brackets 20 extend rearwardly. Each of the brackets 20 is affixed to the forward portion of one of a number of circumferentially spaced ribs 24 that may be of conventional I-beam transverse cross section. Each rib 24 includes a web 25, an outer flange 26, and inner flange 28, as is conventional in an I-beam structure. The inner surface of flange 28 is curved and complementary to a shell D against which it abuts, also as shown in FIGURE 4. Flange 28 is welded to shell D along a bead 28a.

A first tubular shell D is provided that defines a first convergent section 30, a throat 32, and a rearwardly disposed divergent section 34. The circumferential spacing of the ribs 24 will be the same as that of the brackets 20 to which they are attached. The ribs 24 are preferably reinforced circumferentially by second arcuate ribs 29 that extend therebetween, as shown in FIGURES 1 and 4. The ends of ribs 29 abut against the longitudinal sides of ribs 24 and are welded or otherwise rigidly connected thereto by conventional means.

A second straight-walled cylindrical shell E is provided that envelops the first shell D, with the inner surface of the second shell being in abutting contact with the outer flanges 26 of the ribs 24 and welded by a bead 26a thereto as shown in FIGURE 4. A number of small openings 38 are formed in shell D rearwardly of the rear extremity 22a of extension 22, as shown in FIGURE 1. The forward extremities of shells D and E meet to define a circumferentially extending apex 40 as shown in FIGURE 2, and this is likewise true of the rear extremities of the two shells which define a circumferentially extending apex 42. Thus, the inlet opening into shell D defined by edge 40 has the same transverse cross section as the discharge opening from the shell D defined by edge 42. Shells D and E, together with the rib 24, cooperatively define a number of longitudinally extending confined spaces therebetween that are filled with a light, fluffy sound absorbent material F.

The rear portion of the sheath C, together with the extension 22 thereof cooperate with the convergent section 30 of the first shell D to provide a rearwardly extending annulus-shaped space G. As the hot stream of gas B discharges rearwardly from the extension 22 it is at sub-sonic velocity.

The internal diameter of shell D is at a minimum in the throat 32 at the point D–1, and the internal diameter of the shell at point D–1 is preferably slightly larger than the internal diameter of the rear extremity 22a of extension 22. In FIGURE 2 it will be seen that the internal diameter of shell D at the rear extremity thereof is substantially greater than that of the internal diameter of the shell at the point D–1. Thus, three longitudinally spaced transverse openings of varying size are provided by the extension 22 and shell D through which the stream of gases B discharge.

The rear extremity 22a of the extension 22 is defined by a transverse discharge opening K. A second transverse opening K–1 is defined in the throat 32 at the point D–1, which is slightly larger than the area K. A third transverse discharge opening K–2 is defined at the rear extremity of shell D that is substantially larger than opening K–1. As the stream of hot gases B discharges rearwardly from the opening K, the stream B causes a stream of air B' to be drawn rearwardly through the annulus-shaped space G to mix therewith.

The rearwardly flowing air stream B' and the stream of hot gases B combine to form a rearwardly moving gaseous stream B''. The temperature of the air stream B' as it flows rearwardly through the annulus-shaped space G is, of course, that of the ambient atmosphere, but as it mixes with the rearwardly moving stream of gases B, the temperature of the air increases. It will also be obvious that the temperature of the gases B forming a part of the gaseous stream B'' decrease in temperature as they mix with the stream of air B'. Mixing of the air streams B' and B imparts to the gaseous stream B'' a tendency to reach a temperature T–1 that is intermediate the temperature T and the temperature at which the air B' enters the shell D.

Due to the addition of the air stream B' to the stream of gases B, the resulting gaseous stream B'' is of increased mass and volume prior to flowing through the throat 32. The flow of the gaseous stream B'' through the throat 32 is restricted due to the size of the discharge opening K–1 and the velocity of the stream B'' is increased as a result thereof to a velocity V–1. The static pressure of the gaseous stream B'' when in throat 32 drops to a pressure P–1, which is less than that of the ambient atmosphere. This negative static pressure in the throat 32 results in the flow of the stream of air B' rearwardly relative to the shell D.

As a segment of the rearwardly moving gaseous stream B'' passes from the opening K–1 to the opening K–2, it is free to radially expand due to the interior surface configuration of the divergent section 34 of shell D. The heat content of the rearwardly moving hot gases B in the stream B'' furnish the source of energy for this expansion. Accordingly, the radial expansion of a section of the stream B'' results in lowering of the temperature of gases B therein.

The exchange of heat from the stream of gases B to the air stream B' is not instantaneous, but continues as the streams B and B' move rearwardly in the divergent section 34 of shell D. Accordingly, the length of the divergent section 34 should be so related to the rate of flow of the gaseous stream B'' passing therethrough that the streams B and B' are intimately mixed prior to discharge through opening K–2, with the maximum degree of heat exchange having been attained between the two streams. This exchange of heat between streams B and B', as well as the expansion of the two streams that now constitute the stream B'', brings the temperature of stream B'' as it discharges from the opening K–2 to that of T–2. It is highly desirable that the temperature T–2 be as low as possible, for the heat content of the discharging stream B'' is a source of kinetic energy. If the heat content of the discharging stream B'' is not minimized, this heat will be used in the uncontrolled expansion of stream B'' as it discharges from opening K–2. Such expansion is undesirable from the standpoint that it lowers the efficiency of a jet engine, and also gives rise to excessive noise during operation of the engine. As a segment of the gaseous stream B'' moves rearwardly in divergent section 34 from opening K–1 to opening K–2, the velocity thereof decreases to a velocity V–2 at the time of discharge from the opening K–2. The static pressure of the rearwardly moving stream B'' increases, and reaches a pressure P–2 at the time of discharge from opening K–2.

Sound waves created within the confines of the above described device as the pressure and velocity of the rearwardly moving stream of gases B and stream of air B' vary, as well as sound waves created by the gaseous stream B'', are absorbed by the sound absorbent material F, and these sound waves are further broken up to minimize the reflection thereof by the spaced openings 38. A minimum of sound is transferred through the absorbent material F to the second shell E due to the openings 38 which tend to break up and prevent reflection of these sound waves. Sound waves that do pass through openings 38 are also substantially absorbed by the material F prior to reaching the shell E.

A number of different sound absorbent materials may be used for the material F. However, from the standpoint of economy as well as efficiency, finely shredded newspaper can be used for this purpose. Newspaper shredded into pieces ¾" long and ⅟₆₄" wide is satisfactory for this purpose. Either prior to shredding or thereafter, the newspaper is thoroughly impregnated with a commercially available fireproofing compound.

From the above description of the invention it will be seen that the present invention provides the following results:

(a) Substantial reduction of the temperature of the stream of hot gases B prior to discharge thereof from the opening K–2 into the ambient atmosphere;

(b) Substantial reduction of the velocity of the stream of hot gases B prior to discharge from the opening K–2 into the ambient atmosphere;

(c) Discharge of stream B takes place from opening K into the ambient atmosphere with a minimum of frictional resistance;

(d) Increase in engine thrust achieved by discharge of a gaseous stream B″ of increased mass into the ambient atmosphere;

(e) Boost in thrust is at maximum when engine on which invention is installed is stationary;

(f) Openings 38 minimize reflection of noise waves within confines of shell D as well as into ambient atmosphere;

(g) Absorbent material F minimizes transfer of noise waves by conduction to shell E; and (h) Device is substantially lighter in weight and requires substantially less maintenance than noise suppressors available heretofore.

The transverse area of the annulus-shaped space G must be such that when the static pressure at the throat opening K–1 is that of P–1, the rate of flow of the stream of air B′ will be sufficient to cool the stream of gases B to the desired temperature T–2 prior to discharge of the stream of gaseous material B″ from the opening K–2. Also, the openings K–1 and K–2 must be so longitudinally spaced and of such relative transverse cross-sectional area that as a segment of the moving gaseous stream B″ passes through opening K–1 to opening K–2, the transfer of heat between the streams B and B′ is substantially completed and the velocity V–2 of the gaseous stream B″ has decreased to a desired degree where it will not give rise to noise above a predetermined level when discharged from the opening K–2.

In addition, the longitudinal spacing of openings K–1 and K–2 and the configuration of the shell D therebetween must be so related that the temperature of the gaseous stream B″ drops to a desired temperature T–2 prior to discharge of the stream B″ into the ambient atmosphere. Likewise, the openings K–1 and K–2 and their longitudinal spacing in the shell D must be so related that the static head of a segment of the gaseous stream B″ increases from a negative pressure P–1 at the opening K–1 to a pressure P–2 as it discharges from the opening K–2, which latter pressure is as close as possible to that of the ambient atmosphere without increasing the area of the opening K–2 to the extent that the shell D would offer a substantial drag when the engine of which the nozzle A forms a part moves through the atmosphere.

The shell D can be fabricated from a number of different materials, but it is preferable to use spun aluminum, an alloy thereof, or other lightweight material.

The sheath C, as is conventional in present day jet engine design, tapers rearwardly and inwardly from a forward portion of maximum diameter (not shown). The external diameter of the shell E is preferably no greater than the maximum diameter of the sheath C to minimize drag on the invention as it is moved through the air.

The operation of the invention has previously been described in detail and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. The combination with an aircraft-supported jet engine having an exhaust nozzle through which a continuous stream of heated gases is discharged at a first sub-sonic velocity, first pressure and first temperature, a generally cylindrical sheath that envelopes said nozzle, and a transversely positioned first ring that rigidly connects the rear end portions of said sheath and nozzle of a combination noise suppressor and booster, including:

(a) a second rigid ring disposed in abutting contact with a rear surface of said first ring;

(b) first means for removably supporting said second ring from said first ring;

(c) a plurality of circumferentially spaced brackets extending rearwardly from said second ring;

(d) a first tubular shell defining a forwardly disposed convergent section, a throat, and a rearwardly disposed divergent section, with the entrance to said convergent section and the exit from said divergent section being of greater cross-sectional area than that of the rear end of said nozzle;

(e) a plurality of rigid ribs which extend rearwardly from said brackets that hold said first shell in coaxial alignment with said nozzle, with the rear portion of said nozzle projecting into the forward portion of said convergent section, and the interior surface of said convergent section and the exterior surface of said nozzle cooperatively defining an annulus-shaped space;

(f) a second generally cylindrical shell supported from the outer portions of said ribs which envelopes said ribs and said first shell, with the maximum transverse cross section of said second shell being no greater than the maximum transverse cross section of said sheath to minimize the air resistance as said engine moves through the ambient atmosphere; and (g) sound suppressing means operatively associated with said first shell for minimizing the reflection of sound waves that are generated as said stream of heated gases discharges into said first shell to cause a stream of air from the ambient atmosphere to be drawn rearwardly through said annulus-shaped space to mix therewith and form a gaseous stream of increased mass that flows through said throat, said gaseous stream as it flows through said throat increasing to a second velocity greater than said first velocity but less than sonic velocity, with said gaseous stream having a first static pressure that is less than that of the ambient atmosphere, which stream of heated gases is cooled and said stream of air is heated as they flow through said shell to mix and form said gaseous stream, which as it discharges from said divergent section has a second temperature that is substantially lower than said first temperature, with said gaseous stream as it flows through said divergent section radially expanding to cool the same and reduce the discharge velocity thereof to a third velocity that is substantially less than that of said first velocity, with said gaseous stream as it discharges from said divergent section having a second static pressure that is greater than said first static pressure, and with said stream as it discharges into the ambient atmosphere at said third temperature and said second static pressure producing less noise than if said stream of gases from said nozzle was discharged directly to the ambient atmosphere.

2. A combination noise suppressor and booster as defined in claim 1 wherein said noise suppressing means comprise a plurality of longitudinally and circumferentially spaced openings in said shell rearwardly of the rear extremity of said nozzle, with said entrance to said convergent section and said discharge from said divergent section being of substantially the same transverse cross section.

3. A combination noise suppressor and booster as defined in claim 1 wherein said noise suppressing means comprise a plurality of longitudinally and circumferentially spaced openings in said shell rearwardly of the rear extremity of said nozzle and bodies of non-metallic fireproof sound insulating material on the exterior surface of said shell which tend to dampen out any sound waves that may be transferred through said shell or pass through said openings therein.

4. A combination noise suppressor and booster as defined in claim 1 wherein said annulus-shaped space is of such area as to permit a rearward flow of said stream of air in such volume as to cool said gaseous stream to a desired second temperature prior to discharge thereof from said divergent section.

5. A combination noise suppressor and booster as defined in claim 1 wherein the area of said annulus-shaped space is sufficient to permit rearward flow of said stream of air in such volume as to increase the mass of said gaseous stream to the extent that as said gaseous stream expands in flowing from said throat to the discharge from said divergent section an increased thrust is imparted to said engine.

6. A combination noise suppressor and booster as defined in claim 1 wherein the internal cross section of said throat and the cross section of the discharge opening from said divergent section are so related that said second static pressure is at a desired relationship with that of the ambient atmosphere at a particular elevation.

7. A combination noise suppressor and booster as defined in claim 3 wherein said bodies comprise fibrous strips that are impregnated with a fireproof material.

8. A combination noise suppressor and booster as defined in claim 3 wherein said bodies comprise strips of paper in loose association which are impregnated with a fireproof material.

9. A combination noise suppressor and booster as defined in claim 1 wherein said second shell is substantially cylindrical and the forward extremity thereof is rigidly affixed to the forward extremity of said convergent section, with the rear extremity of said second shell being affixed to the rear extremity of said divergent section.

10. A combination noise suppressor and booster as defined in claim 1 which further includes a plurality of longitudinally extending, circumferentially spaced, elongate rigid members disposed between said first and second shells and affixed to the interior surfaces thereof for increasing the rigidity of said first and second shells.

References Cited by the Examiner

UNITED STATES PATENTS

| | | | |
|---|---|---|---|
| 1,159,023 | 11/1915 | Heck | 181—0.5 |
| 1,236,969 | 8/1917 | Muckey | 181—0.5 |
| 1,546,920 | 7/1925 | Douglass | 181—0.5 |
| 1,966,069 | 7/1934 | Kliefoth | 181—33 |
| 2,059,898 | 11/1936 | Osborne | 181—0.5 |
| 2,504,422 | 4/1950 | Johnson et al. | 181—33 |
| 2,514,749 | 7/1950 | Dobbins | 181—33 |
| 2,685,936 | 8/1954 | Brenneman et al. | 181—51 |
| 2,853,852 | 9/1958 | Bodine | 181—33 |
| 2,931,169 | 4/1960 | Glenn | 181—33 |
| 2,944,624 | 7/1960 | Morley | 181—51 |
| 2,979,151 | 4/1961 | Blackwell et al. | 181—51 |

FOREIGN PATENTS

| | | |
|---|---|---|
| 1,171,610 | 10/1958 | France. |
| 653,544 | 5/1951 | Great Britain. |
| 791,112 | 2/1958 | Great Britain. |

LEO SMILOW, *Primary Examiner.*